United States Patent Office 3,328,483
Patented June 27, 1967

3,328,483
CURABLE COMPOSITION CONTAINING AN EPOXY RESIN, POLYMERIC AZELAIC ACID ANHYDRIDE, AND A MONOMERIC ANHYDRIDE OF A POLYCARBOXYLIC ACID
Paul H. Enthoven, Rijswijk, Tette J. Dijkstra, Delft, and Hans P. Schenkels, Nootdorp, Netherlands, assignors to Shell Oil Company, New York, N.Y., a corporation of Delaware
No Drawing. Filed Apr. 7, 1964, Ser. No. 358,053
Claims priority, application Great Britain, Apr. 10, 1963, 14,461/63
17 Claims. (Cl. 260—837)

The invention relates to new and useful resin compositions and more particularly to an epoxy resin composition having improved chemical and physical properties, in particular improved impact strength, and to a method for their preparation.

Specifically, the invention provides new and particularly useful heat-curable resin compositions which can be converted to hard insoluble infusible products having improved impact strength, said compositions comprising a mixture of (1) an epoxy resin having an epoxy equivalency greater than one, and (2) a mixture of polymeric azelaic acid anhydride with a monomeric anhydride of a polycarboxylic acid, such as hexahydrophthalic anhydride. The invention further provides a method for preparing the new compositions.

Resins containing epoxy groups in the molecule are well-known in the art under the name of epoxy, epoxide or ethoxyline resin. In particular, those epoxy resin compositions comprising the reaction product of polyhydric alcohols or phenols with epihalogenohydrins are commercially available, such as, for instance, the reaction product of bis(4-hydroxyphenyl)-2,2-propane and epichlorohydrin.

In order to obtain coatings, moldings, castings or laminates with useful properties, such as high temperature resistance, excellent electrical and mechanical properties as well as light color, the epoxy resins can be cross-linked by adding thereto monomeric anhydrides of polycarboxylic acids, such as phthalic anhydride, partly or completely hydrogenated phthalic anhydrides, pyromellitic dianhydride, endomethylene tetrahydrophthalic anhydride or the alkylated or chlorinated derivatives thereof. In general, curing of the epoxy resins is achieved by subjecting the mixtures of epoxy resin and anhydride curing agent to elevated temperatures. The anhydrides of polycarboxylic acids as curing agents for epoxy resins exhibit specific advantages during the curing process such as low exhibit specific advantages during the curing process such as low volatility, long pot life, low mix viscosity, low shrinkage during cure and no dermatitic effects.

Although the epoxy resin-polycarboxylic acid anhydride compositions provide hard and tough castings and laminates when cured it has been found that some properties, in particular the impact strength, leaves much to be desired, for certain applications.

It is an object of the invention to provide new resin compositions. More particularly, it is an object of the invention to provide new epoxy resin compositions which can be cured to form products having improved impact strength. It is a further object to provide a method for curing epoxy resins with anhydrides which give improved properties. It is a further object to provide a method for preparing cured epoxy resin products having improved impact strength, good elongation at break and excellent tensile and flexural yield strength. It is a further object to provide a method for curing epoxy resins using a mixture of anhydride curing agents. Other objects and advantages of the invention will be apparent from the following detailed description thereof.

It has now been discovered that these and other objects may be accomplished by the new compositions of the invention comprising heat curable composition made up of a mixture of (1) an epoxy resin having an epoxy equivalency greater than one, and preferably a glycidyl polyether of a polyhydric phenol, and (2) a mixture of a polymeric azelaic acid anhydride with a monomeric anhydride of a polycarboxylic acid, such as hexahydrophthalic anhydride. It has been unexpectedly found that these special compositions can be heat cured to form products having excellent impact strength, good elongation at break and excellent tensile and flexural yield strength. In addition, the compositions have the other desired physical properties of epoxy resins, such as good solvent and chemical resistance, good adhesion and the like.

The epoxy resins to be used in the process of the invention comprise those materials possessing more than one vicinal epoxy group, i.e., more than one

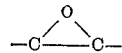

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut, and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl)phthalate, di(2,3-epoxyoctyl) tetrahydrophthalate, di(4,5-epoxydodecyl) maleate, di-(2,3-epoxybutyl) terephthalate, di(2,3-epoxypentyl) thiodipropionate, di(5,6-epoxytetradecyl) diphenyldicarboxylate, di(3,4 - epoxyheptyl) sulfonyldibutyrate, tri(2,3 - epoxybutyl) 1,2,4-butanetricarboxylate, di(5,6-epoxypentadecyl) tartarate, di(4,5-epoxytetradecyl) maleate, di-(2,3-epoxybutyl) azelate, di(3,4-epoxybutyl) citrate, di-(5,6-epoxyoctyl) cyclohexane-1,2-decarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4 - epoxyhexyl 3,4 - epoxyhexyl 3,4 - epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhyhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The epoxy resins used in the invention are preferably polyethers containing epoxy groups as well as possibly hydroxyl groups in the molecule, such as the polyglycidyl ethers of glycerol, resorcinol, hydroquinone, pyrocatechol, bis(4-hydroxyphenyl)propane, -methane, -sulfone and epoxidized novolac resins. Preferred are the polyglycidyl ethers or bis(4-hydroxyphenyl)-2,2-propane which have an epoxy equivalency greater than one and which have a melting point lower than 50° C. The term "epoxy equivalency" refers to the average number of epoxy groups per molecule.

The polymeric azelaic acid anhydride being used in admixture with the monomeric anhydrides according to the invention is of the general formula

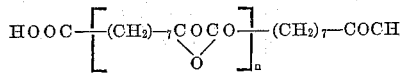

wherein n is any number of from 2 to 40 or more. Preferred is a polymeric product having a molecular weight range of from approximately 500 to approximately 4000, the major amount ranging close to 2000. Methods for preparing polymeric azelaic acid anhydrides are well known in the art. Examples of such processes may be found in Journal of the American Chemical Society, vol. 55, page 5023 (1933). See also Beilstein Handbuch der Organischen Chemie, 4th ed., vol. 17, page 425.

The monomeric acid anhydrides used in the process of the invention may be any anhydride which is derived from a polycarboxylic acid and possesses at least one anhydride group, i.e., a

group. The carboxylic acids used in the formation of the anhydrides may be saturated, unsaturated, aliphatic, cycloaliphatic, aromatic or heterocyclic. They may also possess 1, 2, 3 or more cyclic anhydride groups. Examples of these anhydrides include, among others, phthalic anhydrides, isophthalic anhydride, di-, tetra- and hexahydrophthalic anhydride, di-, tetra- and hexahydrophthalic anhydride, 3,4,5,6,7,7-hexachloro-3,6-endomethylene 1,2-tetrahydrophthalic anhydride (chlorenic anhydride), succinic anhydride, maleic anhydride, chlorosuccinic anhydride, monochloromaleic anhydride, 6-ethyl-4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, adducts of maleic anhydride with polyunsaturates, such as methylcyclopentadiene (Nadic methyl anhydride), 3-methoxy-1,2,3,6-tetrahydrophthalic acid anhydride, 3-butoxy-1,2,3,6-tetrahydrophthalic anhydride, trimellitic anhydride, pyromellitic anhydride, pyromellitic anhydride, di-, tetra- and hexahydropyromellitic anhydride, polyadipic acid anhydride, polysebacic acid anhydride, and the like and mixtures thereof. Derivatives of the anhydrides, such as their partial esters, amides, etc. may also be employed. Examples of these include, for example, esters of glycols and pyromellitic anhydride and partial esters of trimellitic anhydride.

Preferred anhydrides to be employed in the process comprise the aliphatic, cycloaliphatic and aromatic mono- and dianhydrides (i.e., those possessing two of the above-noted anhydride groups such as pyromellitic anhydride), and the chlorinated derivatives of the aforedescribed anhydrides. Especially preferred are the normally liquid or low melting anhydrides and those which dissolve in the epoxy below 100° C. at atmospheric pressure.

The polymeric azelaic acid anhydride being used for the composition of the invention is preferably mixed with the monomeric anhydride in a weight ratio of from 10:1 to 1:10. Particularly preferred amounts vary from about 4:1 to 1:4 on a weight basis.

It is sometimes desirable to employ activators or accelerators with the anhydrides. These include, among others, tertiary amines, phenols, sulfides, mercaptans, organic phosphines, organic arsines, organic antimony compounds, amines, amine salts or quaternary ammonium salts, etc. Preferred activators are the phenols, phosphines, arsines, amines, and sulfides, such as, for example, 2,4,6-tri(dimethylaminomethyl)phenol benzyldimethylamine, dicyandiamide p,p'-bis(dimethylaminophenyl)methane, pyridine, dimethyl aniline, dimethylethanolamine, methyldiethanolamine, morpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine, dibutyl sulfide, dioctyl sulfide, dicyclohexyl sulfide and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like and mixtures thereof.

Preferred activators to be used are the sulfides, phosphines and tertiary amines, and more preferably the mono- and diamines wherein the amine hydrogens have been replaced by aliphatic, cycloaliphatic or aromatic hydrocarbon radicals containing not more than 15 carbon atoms such as, for example, the trialkyl amines, triaryl amines, triarylalkylamines, alkyl arylalkylamines, tricycloalkylamines, alkyl dicycloalkylamines, diaminoalkanes, dialkylene triamines, phenylene diamines and di(aminoaryl) alkanes. Preferred amine salts are the hydrochloride, sulfate and acetate of the above-described preferred amines. The preferred quaternary salts are those of the formula

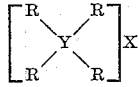

wherein Y is nitrogen, R is an alkyl, aryl or arylalkyl radical, preferably containing no more than 12 carbon atoms and X is chlorine.

The activator noted above are generally employed in amounts varying from 0.1 part to 6 parts per 100 parts of epoxy resin, and preferably from 1 part to 3 parts per 100 parts of epoxy resin.

In order to prepare the compositions of the invention the mixture of both, polymeric azelaic acid anhydride and monomeric polycarboxylic acid anhydride, is added to the epoxy resin, or the resin is added to the mixture of anhydrides. If the components of the compositions are normally liquids the mixing is being carried out by stirring. If one of the components of the compositions is a solid, the other being a liquid, it is preferred to mix the components at a temperature which allows the solid component to dissolve readily in the liquid component of the composition, e.g., 40–60° C. The amount of the mixture of polymeric azelaic acid anhydride and monomeric anhydride which is used in the composition of the invention may be any amount. Preferred amounts, however, are those providing as complete a crosslinking as possible, preferably from 50 to 100 percent by weight of the epoxy resin, or more. Customarily amounts are used providing 0.7 to 1.1 moles of anhydride carboxyl per epoxy equivalent.

The composition of the invention may be used to prepare coatings, moldings, castings and laminates. For this and other purposes diluents, fillers, pigments, plasticizers and flexibilizers may be added to the composition. In most cases it is desirable to add an accelerator in order to obtain shorter curing cycles. In particular the compositions of the invention are suitable to prepare laminates since they provide excellent adhesion, good wetting properties and low shrinkage during cure. Suitably reinforced with materials, such as glass fiber, polyamides, or polyester fibers, they give laminates with high dimensional stability, excellent chemical resistance, high impact strength, high compressive, tensile and flexural strength, good fatigue resistance and good electrical properties. Such laminates are prepared by impregnating the structural material with the liquid or liquefied composition of the invention and bringing the impregnated material into shape by various techniques, such as molding, filament winding, injection into molds and other techniques, if required under pressure. By such techniques using the compositions of the invention laminates such as containers, bodies for cars and ships of outstanding shock resistance can be manufactured.

The invention may be further illustrated by the following examples.

Example I

A mixture of the following components was prepared:

| | Parts by weight |
|---|---|
| Polyglycidyl ether of bis(4 - hydroyphenyl) - 2,2-propane having an epoxy equivalency of 1.75, a viscosity of 150 poises at 25° C. and an average molecular weight of 350 | 128.5 |
| Hexahydrophthalic anhydride | 50 |
| Polymeric azelaic acid anhydride having an average molecular weight of 2000, and a melting point of approximately 60° C. | 50 |
| 2,4,6-tri(dimethylaminomethyl) phenol (accelerator) | 3.4 |

The mixture was cured for two hours at 100° C. followed by 3 hours at 150° C. The resulting product was a hard insoluble infusible product having good impact strength. After curing, the following properties were found:

| | |
|---|---|
| Izod notched impact strength _____kg./cm./cm.$^2$_ | 10.9 |
| Elongation at break _____percent__ | 7.5 |
| Ultimate tensile strength _____kg./cm.$^2$__ | 580 |
| Flexural yield strength _____kg./cm.$^2$__ | 1000 |

The specimen tested did not break under the condition of a test for determining the ultimate flexural strength. Extraction of a sample with boiling methylethylketone for 3 hours gave a 0.5% of soluble material. For comparison a mixture of 100 parts by weight of the above-mentioned polyglycidyl ether with 80 parts of hexahydrophthalic anhydride and 1 part by weight of 2,4,6-tri(dimethylaminomethyl)phenol was prepared and cured at the same conditions as mentioned above. The cured composition showed an Izod notched impact strength of only 6.8 kg./cm./cm.$^2$ and an elongation at break of 4.1%.

Example II

A mixture of the following components was prepared:

| | Parts by weight |
|---|---|
| Polyglycidyl ether of bis(4-hydroxyphenyl)-2,2-propane used in Example I | 127 |
| Hexahydrophthalic anhydride | 75 |
| Polymeric azelaic acid anhydride used in Example I | 25 |
| 2,4,6-tri(dimethylaminomethyl)phenol | 3.4 |

The mixture was cured for two hours at 100° C. followed by 3 hours at 150° C. The resulting product was a hard insoluble infusible product having good impact strength. After curing, the following properties were found:

| | |
|---|---|
| Izod notched impact strength ____kg./cm./cm.$^2$__ | 8.3 |
| Elongation at break _____percent__ | 4.1 |
| Ultimate tensile strength _____kg./cm.$^2$__ | 710 |
| Flexural yield strength _____kg./cm.$^2$__ | 1170 |
| Vicat softening temperature (5 kg. load, 0.1 mm. pentration) _____° C__ | 101 |

Extraction of a sample with boiling methylethylketone for 3 hours gave 0.5% of soluble material.

By reversing the amounts of hexahydrophthalic anhydride and polymeric azelaic acid anhydride the Izod notched impact strength of the cured composition was found to be 10.9 kg./cm./cm.$^2$.

Example IIII

A mixture of the following components was prepared:

| | Parts by weight |
|---|---|
| Polyglycidyl ether of bis(4-hydroxyphenyl)-2,2-propane used in Example I | 122 |
| Methyl endomethylene tetrahydrophthalic anhydride | 50 |
| Polymeric azelaic acid ahydride used in Example I | 50 |
| Benzyldimethylamine (accelerator) | 3.3 |

The mixture was cured for two hours at 100° C. followed by 6 hours at 150° C. The resulting product was a hard, insoluble, infusible product having good impact strength. After curing the following properties were found:

| | |
|---|---|
| Izod notched impact strength _____kg./cm./cm.$^2$__ | 8.2 |
| Ultimate tensile strength _____kg./cm.$^2$__ | 545 |
| Flexural yield strength _____kg./cm.$^2$__ | 1060 |

The mixture from 100 parts by weight of polyglycidyl ether of bis(4-hydroxyphenyl)-2,2-propane, 90 parts by weight of methyl endomethylene tetrahydrophthalic anhydride, and 1.9 parts by weight of benzyldimethylamine had an Izod notched impact strength of only 3.4 kg./cm./cm.$^2$ after curing under the same conditions.

Example IV

A mixture of the following components was prepared:

| | Parts by weight |
|---|---|
| Polyglycidyl ether of bis(4-hydroxyphenyl)-2,2-propane used in Example I | 133 |
| Phthalic anhydride | 25 |
| Polymeric azelaic acid anhydride used in Example I | 75 |
| Benzyldimethylamine (accelerator) | 3.5 |

The mixture was cured for 2 hours at 100° C. followed by 6 hours at 150° C. After curing the following properties were found:

Izod notched impact strength _____kg./cm./cm.$^2$__ 12.1
Ultimate tensile strength _____kg./cm.$^2$__ 400
Flexural yield strength _____kg./cm.$^2$__ 875

A similar mixture containing as the curing agent mixture 50 parts by weight of each, phthalic anhydride and polymeric azelaic acid anhydride, showed after curing under the same conditions the following properties:

Izod notched impact strength _____kg./cm./cm.$^2$__ 8.5
Ultimate tensile strength _____kg./cm.$^2$__ 620
Flexural yield strength _____kg./cm.$^2$__ 1095

For comparison a mixture was prepared consisting of 100 parts by weight of the polyglycidyl ether of bis(4-hydroxyphenyl) 2,2-propane, 75 parts by weight of phthalic anhydride and 0.2 part by weight of benzyldimethylamine. After curing under the same conditions a sample showed an Izod notched impact strength of only 5.0 kg./cm./cm.$^2$.

*Example V*

Examples I and II are repeated with the exception that the monomeric anhydride is as follows: chlorendic anhydride, succinic anhydride, methyl nadic anhydride, dodecenylsuccinic anhydride, pyromellitic anhydride, trimellitic anhydride and chlorosuccinic anhydride. Related results are obtained.

We claim as our invention:

1. A composition of matter curable by heat comprising (1) an epoxy resin having an epoxy equivalency greater than one and (2) a mixture of polymeric azelaic acid anhydride and a monomeric anhydride of a polycarboxylic acid.
2. A composition as claimed in claim 1, wherein the epoxy resin is a polyglycidylether of bis(4-hydroxyphenyl)-2,2-propane.
3. A composition as claimed in claim 2, wherein the epoxy resin has a melting point lower than 50° C.
4. A composition as claimed in claim 1 wherein the weight ratio of polymeric azelaic acid anhydride to monomeric anhydride of a polycarboxylic acid is in the range of from 10:1 to 1:10.
5. A composition as in claim 1 wherein the polymeric azelaic acid anhydride has a molecular weight ranging from approximately 500 to approximately 4000.
6. A composition as in claim 1 wherein the monomeric anhydride of a polycarboxylic acid is a member of the group consisting of hexahydrophthalic anhydride, methyl endomethylene tetrahydrophthalic anhydride and phthalic anhydride.
7. A composition as in claim 1 wherein the mixture of polymeric azelaic acid anhydride with the monomeric anhydride of a polycarboxylic acid is from 50 to 100 percent by weight of the epoxy resin.
8. A composition as in claim 1 wherein the monomeric anhydride is hexahydrophthalic anhydride.
9. A process for curing a heat-curable epoxy resin having an epoxy equivalency greater than one, wherein there is used as curing agent a mixture of polymeric azelaic acid anhydride with monomeric anhydride of a polycarboxylic acid.
10. A process as in claim 9 wherein the epoxy resin used is a polyglycidyl ether of bis(4-hydroxyphenyl)-2,2-propane.
11. A process as in claim 9 wherein the epoxy resin used has a melting point lower than 50° C.
12. A process as in claim 9 wherein the weight ratio of polymeric azelaic acid anhydride to monomeric anhydride of a polycarboxylic acid is in the range of from 10:1 to 1:10.
13. A process as in claim 9 wherein the polymeric azelaic acid anhydride used has a molecular weight ranging from approximately 500 to approximately 4000.
14. A mixture of polymeric azelaic acid anhydride having a molecular weight in the range of from 500 to 4000 with a monomeric anhydride of a polycarboxylic acid.
15. A process as in claim 9 wherein the monomeric anhydride is phthalic anhydride.
16. A process as in claim 9 wherein the monomeric anhydride is dodecylsuccinic anhydride.
17. A process as in claim 9 wherein the monomeric anhydride is methyl nadic anhydride.

References Cited

Plastic Technology; R. G. Black, March 1964, pages 37, 38, 39.

MURRAY TILLMAN, *Primary Examiner.*

PAUL LIEBERMAN, *Assistant Examiner.*